United States Patent Office 3,000,935
Patented Sept. 19, 1961

3,000,935
POLYNITRAZA DIBASIC ACIDS
Clinton R. Vanneman, Claremont, and Karl Klager, Monrovia, Calif., assignors to Aerojet-General Corporation, Azusa, Calif., a corporation of Ohio
No Drawing. Filed Sept. 6, 1955, Ser. No. 532,731
13 Claims. (Cl. 260—534)

This invention relates to new compositions of matter and a method for their preparation. In particular, this invention relates to polynitraza dibasic acids having the general formula:

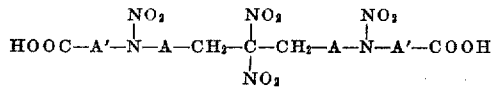

wherein A and A' are lower alkylene radicals.

The acids of this invention can be converted to their corresponding diisocyanate derivatives by the method disclosed in our copending application Serial No. 451,707, filed August 23, 1954, now abandoned.

The diisocyanates thus obtained react with polyalcohols such as ethylene glycol and 3,3-dinitro-1,5-pentanediol, in the presence of a catalyst such as boron trifluoride, to yield high molecular weight polyurethane compositions useful as solid propellants, according to the method disclosed in assignee's copending application Serial No. 422,649, filed April 12, 1954, now abandoned. The polyurethanes are cast or pressed into a suitable shape, usually a cylinder, and placed in a conventional rocket chamber. To produce thrust for propulsion, the propellant is simply ignited whereby large quantities of gases are produced which impart forward thrust to the rocket upon exhaustion. The propellant can be ignited by any conventional igniter, as for example the igniter disclosed in assignee's copending application Serial No. 306,030, filed August 23, 1952.

The compounds of this invention are prepared by hydrolyzing polynitraza, dinitriles, in accordance with the general reaction scheme set forth below:

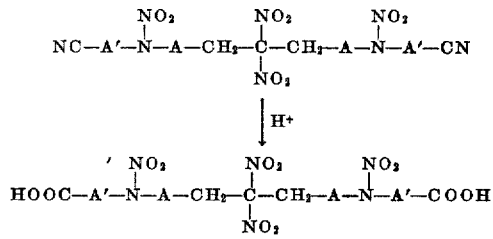

wherein A and A' are lower alkylene radicals.

Due to the sensitivity of the geminal dinitro groups toward strong alkali, we prefer to conduct the hydrolysis in acid media. Any of the mineral acids can be employed for this purpose.

It is preferred to conduct the hydrolysis at from about 50° to 75° C. Higher and lower temperatures can be used if desired, however, the reaction proceeds more slowly at lower temperatures and becomes difficult to control at higher temperatures.

The polynitraza dinitriles suitable as starting materials in this invention are prepared by reacting nitro-aza-dinitriles with nitric acid, as disclosed in our copendng application Serial No. 532,730, filed concurrently with this application.

To more clearly illustrate this invention, the following example is presented. It is to be understood, however, that this example is presented merely as a means of illustration and is not intended to limit the scope of the invention in any way.

EXAMPLE I

Preparation of 4,7,7,10-tetranitro-4,10-diaza-1,13-tridecanedioic acid

A mixture of 102.7 gm. (0.264 mole) 4,7,7,10-tetranitro-4,10-diaza-1,13-tridecane dinitrile and 1200 ml. concentrated hydrochloric acid was warmed on the steambath with occasional agitation. The temperature was raised to 65-70° C. during a 15-20 minute period, in which solution of the dinitrile was completed. A solid precipitated from solution, forming a solid mass after about 40 minutes of continued heating. Water (750 ml.) was added and heating at 90-95° C. was continued for one hour. The hot mixture was filtered, and the product was washed with water and dried in a vacuum desiccator over phosphorous pentoxide. A 92.5% yield (103 gm.) of 4,7,7,10-tetranitro-4,10-diaza-1,13-tridecanedioic acid, M.P. 153.5–156° C., was obtained on recrystallization from methanol. The elemental analysis of the product was as follows: Calculated for $C_{11}H_{18}O_{12}N_6$: Percent C., 30.99; percent H, 4.26; percent N, 19.72. Found: Percent C., 31.16; percent H, 4.37; percent N, 20.66.

Polynitraza dinitriles such as 4,8,8,12-tetranitro-4,12-diaza-1,15-pentadecane dinitrile, 4,9,9,14-tetranitro-4,14-diaza-1,17-heptadecane dinitrile, 5,9,9,13-tetranitro-5,13-diaza-1,17-heptadecane dinitrile, and 4,7,7,11-tetranitro-4,11-diaza-1,15-pentadecane dinitrile also hydrolyze in the manner set forth in Example I to form polynitraza acids, namely, 4,8,8,12-tetranitro-4,12-diaza-1,15-pentadecanedioic acid, 4,9,9,14-tetranitro-4,14-diaza-1,17-heptadecanedioic acid, 5,9,9,13 - tetranitro - 5,13 - diaza-1,17-heptadecanedioic acid, and 4,7,7,11-tetranitro-4,11-diaza-1,15-pentadecanedioic acid, respectively. Higher and lower homologues of these compounds can be prepared in the like manner simply by hydrolyzing the appropriate dinitrile.

Any member of the disclosed series of dibasic acids can be prepared merely by hydrolyzing an appropriate nitraza dinitrile, in accordance with the teachings of this invention.

This application is a continuation-in-part of our copending application Serial No. 439,469, filed June 25, 1954, now abandoned.

We claim:

1. As compositions of matter, the polynitraza dibasic acids having the formula:

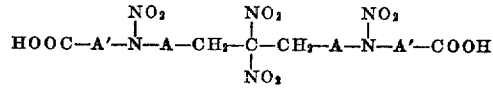

wherein A and A' are lower alkylene radicals.

2. As a composition of matter, 4,7,7,10-tetranitro-4,10-diaza-1,13-tridecanedioic acid having the structural formula:

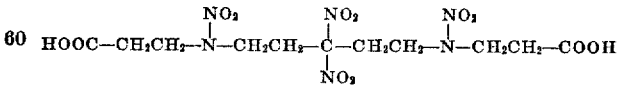

3. As a composition of matter, 4,8,8,12-tetranitro-4,12-diaza-1,15-pentadecanedioic acid having the structural formula:

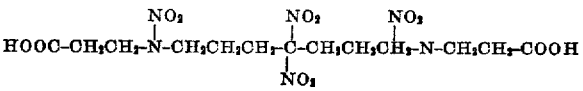

4. As a composition of matter, 4,9,9,14-tetranitro-4,14- diaza-1,17-heptadecanedioic acid having the structural formula:

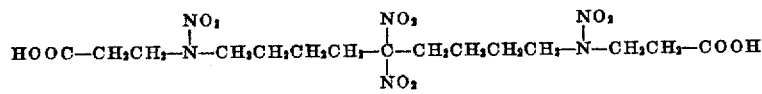

5. As a composition of matter, 5,9,9,13-tetranitro-5,13-diaza-1,17-heptadecanedioic acid having the structural formula:

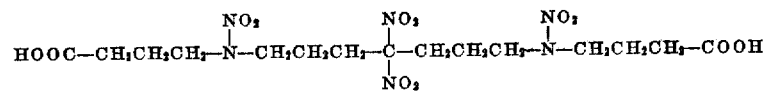

6. As a composition of matter, 4,7,7,11-tetranitro-4,11-diaza-1,15-pentadecanedioic acid having the structural formula:

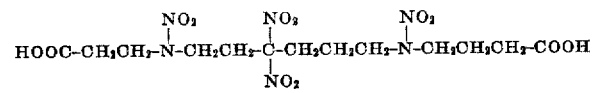

7. The method of preparing polynitraza dibasic acids having the formula:

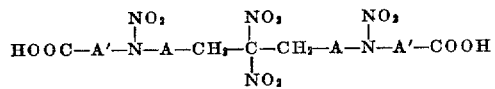

which comprises hydrolyzing polynitraza dinitriles having the formula:

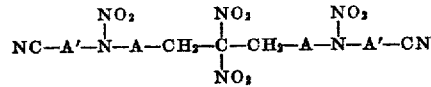

wherein A and A' are lower alkylene radicals.

8. The method of claim 7 wherein the hydrolysis is conducted in the presence of a strong mineral acid.

9. The method of preparing 4,7,7,10-tetranitro-4,10-diaza-1,13-tridecanedioic acid which comprises hydrolyzing 4,7,7,10-tetranitro-4,10-diaza-1,13-tridecane dinitrile with a strong mineral acid.

10. The method of preparing 4,8,8,12-tetranitro-4,12-diaza-1,15-pentadecanedioic acid which comprises hydrolyzing 4,8,8,12-tetranitro-4,12-diaza-1,15-pentadecane dinitrile with a strong mineral acid.

11. The method of preparing 4,9,9,14-tetranitro-4,14-diaza-1,17-heptadecanedioic acid which comprises hydrolyzing 4,9,9,14-tetranitro-4,14-diaza-1,17-heptadecane dinitrile with a strong mineral acid.

12. The method of preparing 5,9,9,13-tetranitro-5,13-diaza-1,17-heptadecanedioic acid which comprises hydrolyzing 5,9,9,13-tetranitro-5,13-diaza-1,17-heptadecane dinitrile with a strong mineral acid.

13. The method of preparing 4,7,7,11-tetranitro-4,11-diaza-1,15-pentadecanedioic acid which comprises hydrolyzing 4,7,7,11-tetranitro-4,11-diaza-1,15-pentadecane dinitrile with a strong mineral acid.

References Cited in the file of this patent
UNITED STATES PATENTS 2,485,855  Blomquist et al. _____ Oct. 25, 1949